June 12, 1945.   F. E. PAYNE   2,378,095
FLUID SEAL
Filed April 27, 1942

Inventor:
Frank E. Payne
By Kent W. Wonnell Atty

Patented June 12, 1945

2,378,095

UNITED STATES PATENT OFFICE 2,378,095

FLUID SEAL

Frank E. Payne, Winnetka, Ill., assignor to Crane Packing Company, Chicago, Ill., a corporation of Illinois Application April 27, 1942, Serial No. 440,652

2 Claims. (Cl. 286—7)

This invention relates in general to a fluid seal for shafts, bearings, and the like, and is more particularly described as a seal for a water pump.

An important object of the invention is in the provision of a rubber-like sealing member preferably in the form of a ring adapted to be compressed or preloaded upon a shaft or another member to which it is applied and combined with an anti-frictional washer or member having a recess or groove to receive the sealing member and compressed therein by a spring seated in a groove or recess of the sealing member.

A further object of the invention is to provide a fluid seal which comprises a doughnut type sealing member adapted to be preloaded upon a shaft or other circular member and having a recess or groove in which a compression spring is seated for additionally holding it in sealing position.

Other objects of the invention will appear in the specification and will be apparent from the accompanying drawing, in which Fig. 1 is a sectional view showing a seal in accordance with this invention as applied to a shaft;

In a fluid seal for a pump, it is customary to provide an anti-frictional washer or disc which makes a fluid tight engagement with a fixed portion, usually one end of the bearing in which a shaft is mounted to rotate the disc with respect to the bearing, and to make a fluid tight connection between the opposite face of the disc and the adjacent surface of the shaft which are relatively at right angles to each other. This is accomplished in the present invention by preloading a circular ring or doughnut type of sealing member upon a shaft so that only a small portion of the ring is slidable on or in engagement with the shaft and in compressing the ring by means of a spring against the surface of the sealing disc or in a formed recess in the disc such that compression of the sealing ring by the spring will tend also to expand the seal tightly against the shaft as well as against the anti-friction washer.

Figure 1:
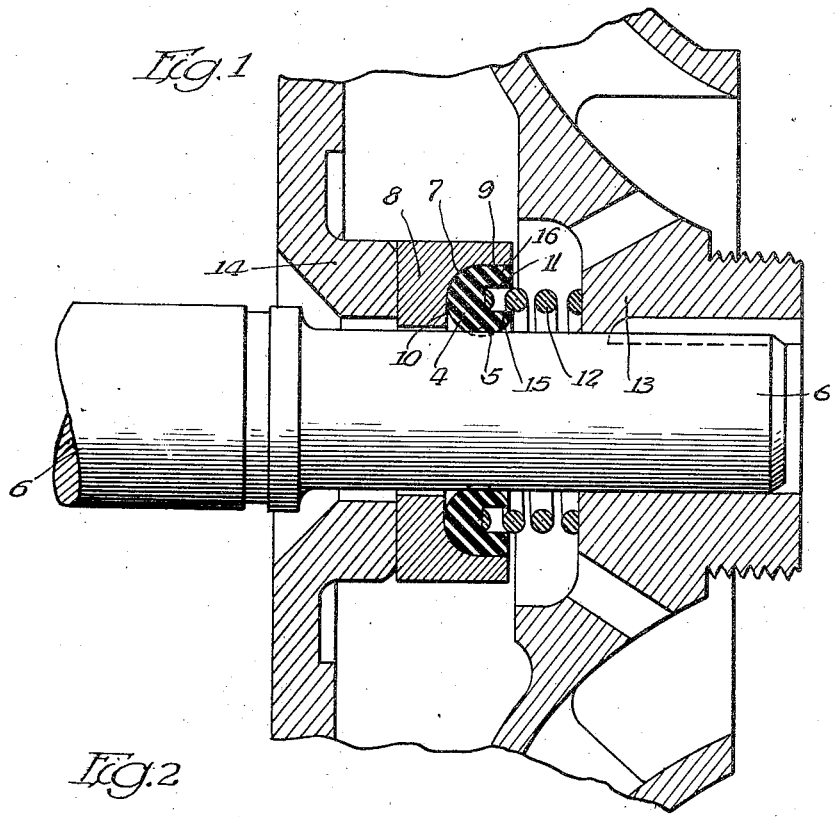

Referring now more particularly to Fig. 1, a rubber-like seal 4 of the doughnut type partially circular in cross section is compressed or preloaded upon an inner flattened surface 5 on a shaft 6. This ring is seated in a recess 7 of an anti-frictional disc 8 curved to substantially fit the circular cross section of the seal and having a side wall 9 and a bottom wall 10 at right angles to each other and substantially containing the seal therein.

In the side opposite the washer is a recess 11 to receive the extremity of a coil spring 12 which is seated therein, one end bearing against the recess and the other bearing against a rotating member 13 secured to the shaft. At one side of the recess, the outer edge of the seal has a rounded projection 15 extending away from the shaft and at the opposite side of the recess is a rectangular projection 16 adapted to fit against the side wall 9. The spring 12 tends to spread the sides of the recess 11 when compressed.

At its contact face, the anti-frictional disc 8 engages a fixed bearing 14 for the shaft, the relation of the parts being such that as the shaft is rotated, a slight longitudinal or endwise movement is possible without displacing the sealing members, the spring 12 pressing the sealing member against the recess of the sealing disc and also because of the shape of the recess, against the shaft 6 thereby making a double sealing contact between the shaft and the recess of the disc, and the disc being pressed against the contact surface at the end of the bearing 14.

Figures 2, 3:
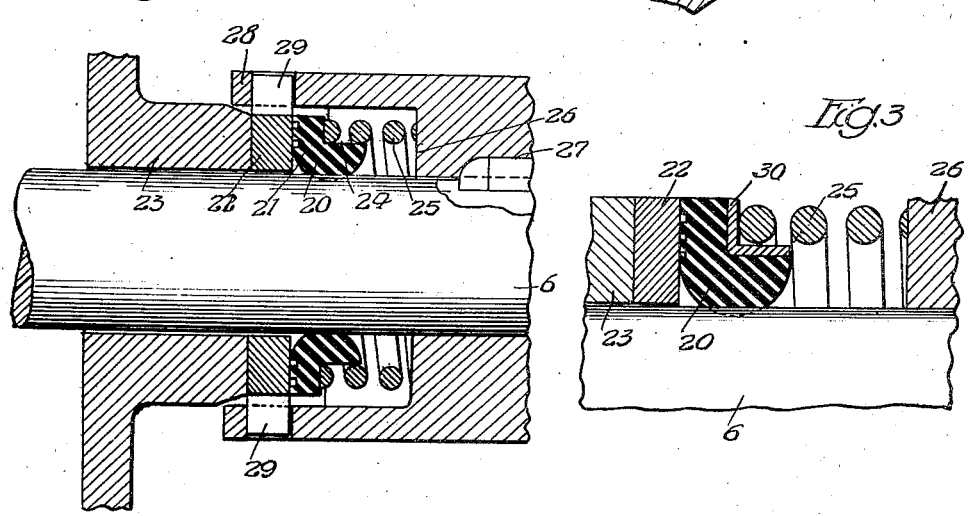
Fig. 2 illustrates a modification of the seal.
Fig. 3 shows a seal similar to Fig. 2 with a retaining ring.

In that form of the invention as shown in Fig. 2, a sealing member 20 is also partially circular in cross section, preloaded, or compressed upon the shaft, it has a straight wall 21 at right angles to the shaft which bears against a flat contact surface of a sealing disc 22 which in turn makes a water tight sliding connection with a fixed bearing 23 of the shaft.

In the side of the member 20 opposite the shaft and the disc is a right angled groove or recess 24 engaged on the side opposed to the disc by a coil spring 25 which abuts the bottom of a recess 26 of a member 27 secured to the shaft. If desired, this member may have a flange with projections 28 for engaging ears 29 formed on the disc 22 for rotating it with the shaft and seal.

In the form of the invention shown in Fig. 3, a retaining ring 30 of metal or any other suitable material is interposed between the end of the spring 25 and the angular groove 24 in the sealing member.

All of these forms have the advantage that only a small portion of the sealing member is sliding or contacts with the shaft, and when the sealing member is additionally compressed by a spring seated in a groove, the lips or edges of the sealing member are pressed against the shaft and against the sealing disc or washer at right angles to each other, tending thereby to make a more dependable seal and to maintain a fluid tight joint.

I claim:

1. A shaft seal, comprising an anti-friction sealing ring to fit loosely about a shaft and having a recess in one face forming a quarter-round groove surrounding the shaft; a ring of rubber-like sealing material partially circular in cross-section and of an internal diameter to be preloaded upon the shaft and seated in the groove, the circular portion rounding away from the bottom of the recess and away from the shaft, and another portion fitting against the outer wall of the groove and flush with the edge of the recess; and a spring to engage the exposed side of the sealing material to press it into the groove and against a shaft.

2. In a shaft seal, an anti-friction sealing disc to fit loosely about a shaft and having a circular recess in one face rounded at the bottom, a rubber-like sealing ring preloaded upon the shaft and seated in the recess, the ring having an angular outer rib to fit the wall of the recess and flush with the edge thereof and otherwise round in cross-section to engage the shaft and the bottom of the recess, the exposed edge of the ring when seated in the recess having a central groove extending inwardly parallel to the shaft, and a coil spring of wire having an extremity to fit within the said groove, the depth of the groove being greater than the diameter of the spring material which tends to prevent the ring from tipping over and keeps it centered in the recess.

FRANK E. PAYNE.